United States Patent
Cushman et al.

[19]

[11] Patent Number: 5,905,820
[45] Date of Patent: May 18, 1999

[54] ENHANCEMENT OF DIGITAL IMAGES FOR ELECTRONIC DISPLAYS

[75] Inventors: William H. Cushman; Mohsen Ghaderi, both of Rochester, N.Y.; Fereidoon Samii, Sunnyvale, Calif.; Joseph P. Di Vincenzo, Rochester, N.Y.

[73] Assignee: Eastman Kodak Company, Rochester, N.Y.

[21] Appl. No.: 07/809,984

[22] Filed: Dec. 18, 1991

[51] Int. Cl.$^6$ .................................................... G06K 9/32
[52] U.S. Cl. ............................ 382/299; 358/429; 358/451
[58] Field of Search ................................. 382/47, 54, 56; 340/731, 703, 793, 803; 358/451, 429, 262.1, 462, 426, 465

[56] References Cited

U.S. PATENT DOCUMENTS

| | | | |
|---|---|---|---|
| 4,783,837 | 11/1988 | Kawamura et al. | 382/50 |
| 4,847,786 | 7/1989 | Wang et al. | 382/51 |
| 4,879,753 | 11/1989 | El-Sherbini | 382/50 |
| 4,897,799 | 1/1990 | Le Gall et al. | 364/514 |
| 4,969,051 | 11/1990 | Sasaki | 358/462 |
| 5,001,576 | 3/1991 | Tanaka et al. | 358/462 |
| 5,138,672 | 8/1992 | Hirabayashi et al. | 382/54 |
| 5,153,936 | 10/1992 | Morris et al. | 395/128 |

*Primary Examiner*—Christopher S. Kelley
*Attorney, Agent, or Firm*—Peyton C. Watkins

[57] ABSTRACT

A method and apparatus for enhancing an image for a display, first digitizes the image to produce a map of the image, this map containing pixels having $2^n$ grey levels where n is the number of bits per pixel. The map of the image is then downsampled to produce a downsampled map of the image. Thresholding is then performed on the downsampled map of the image to reduce the number of bits per pixel from n bits to m bits to produce a thresholded downsampled map of the image, where m is less than n. The number of bits per pixel is restored from m bits to p bits, where p is greater than m, to produce a restored thresholded downsampled map of the image. The restored thresholded downsampled map of the image can be downsampled again to produce an image map suitable for display on a low to moderate cost display, such as a CRT, with grey scale capability. The displayed image has an enhanced appearance, since it is high fidelity with respect to the original.

53 Claims, 5 Drawing Sheets

ENHANCEMENT OF DIGITAL IMAGES FOR ELECTRONIC DISPLAYS

FIELD OF THE INVENTION

The present invention relates to the fields of image processing for electronic displays, and more particularly, to the displaying or imaging of documents having text and graphics so as to be legible and acceptable on an inexpensive electronic display with low to moderate resolution.

BACKGROUND OF THE INVENTION

The quality of digitally processed images of documents depends on the nature of the original document, the digitization process (including an image processing algorithm), noise introduced between digitization and display, and the quality of the display device. One of the most effective methods for assuring good image quality is to use a high sampling density during digitization and a high resolution display device. However, the costs for data storage, data processing, data transmission, and display hardware can be prohibitive. Accordingly, efforts have been made to produce satisfactory images at lower cost.

A considerable amount of work has been devoted to determining the minimum requirements for the display of bi-level (1 bit/pixel) digitized images of text. For example, it has been found that a minimum pixel frequency of 110 pixels per inch (ppi hereinafter) was required for 97.5% legibility of standard typewritten and printed materials. A pixel frequency of 125 ppi was found to be necessary for 99% correct recognition. (Arps et al., "Character Legibility Versus Resolution in Image Processing of Printed Matter", *IEEE Transactions on Man-Machine Systems,* volume 10, page 66–71 (1969)).

Both the legibility and the subjective appearance of digitized images of text can be improved by increasing input and output resolution. Creating levels of grey may have the same effect under certain circumstances. Grey levels may be created from bi-level (black and white) text documents by prefiltering during the initial digitization process or by post filtering.

It has been found that digitally processed images of handwritten and machine-printed characters are more legible when the number of grey levels was increased from two (1 bit/pixel) to eight (3 bits/pixel). The effect was most pronounced when the sampling density was relatively low (i.e., 80 samples/inch). Under these conditions, the error rate for character recognition was decreased from 26% to 19%. (Lee et al., "Digital Image Quality as a Function of Sampling Density and Grey Levels", *Occupational Health and Safety, Proceedings of the Twelfth Annual Meeting of the Human Factors Association of Canada* (pages 9.1–9.5), 1979.) Similarly, it has been shown that the subjective quality of digitized images of text could be improved by using four or more grey levels (i.e., at least 2 bits/pixel). (Warnock, "The Display of Characters Using Grey Level Sample Arrays" *Computer Graphics, Siggraph '80 Conference Proceedings* (pages 302–307), (1980)).

There is a need for a method and apparatus for processing and displaying digital images of text and graphics for imaging applications involving electronic displays that have moderate spatial resolution and grey scale capability so that business documents can be displayed at lower cost than with high resolution bi-level black and white monitors that are typically used.

SUMMARY OF THE INVENTION

This and other needs are met by the present invention which provides a method of enhancing an image for display which includes the steps of digitizing the image to produce a map of the image, this map containing pixels having assigned amplitudes represented by n bits per pixel. The size (or spatial resolution) of the image map is then reduced by downsampling (or other pixel reduction method such as spatial averaging). The downsampled (or reduced digital data resolution) map (i.e., the map produced by the downsampling operation) is then processed to reduce the number of bits per pixel from n bits to m bits by establishing t thresholds, where t is equal to $2^m-1$. All amplitude values between two given thresholds are reassigned a common value. For example, all amplitudes between 0 and $t_1$ might be reassigned an amplitude of 0, all amplitudes between $t_1$ and $t_2$ might be reassigned a value of 1, all amplitudes between $t_2$ and $t_3$ might be reassigned a value of 2, and so forth. The sizes of the intervals between thresholds need not be equal. This process for reducing the number of bits per pixel, (sometimes referred to as quantizing), is referred to hereafter as "thresholding", and the resulting bitmap is referred to, hereafter, as the "thresholded downsampled map". The number of bits per pixel in the thresholded downsampled map is then increased from m bits to p bits (p is always greater than m) by convolution. The number of pixels in the "restored" downsampled map is again reduced by downsampling (or other process such as spatial averaging) if necessary to rescale the size of the image map prior to display (e.g., so the displayed image will be the same size as the original). After this final processing step, the image may be displayed.

One of the ways in which images which were scanned at high resolution have been made available for display on a low resolution display, has been to downsample the digitized image, followed by the use of a look up table. As an example, an area of text would be scanned at 400 ppi, then downsampling is performed (all at once) to reduce the resolution to 100 ppi (i.e., down sampling by four). After the downsampling, a look up table is used in the prior art to provide a gamma correction for a specific type of output device.

A major problem with the prior art approach becomes apparent when used with documents having different styles of text and graphics in the same document. In order to produce good images, a large number of look up tables would need to be developed and subsequently stored (which is memory intensive). The process also requires additional computations.

Some of the advantages of the present invention include better image quality when displays with low to moderate resolution are used (as compared with the prior art described above), higher image compression ratios when used in conjunction with established image compression methods, and the capability for accommodating several types of "adaptive thresholding." For example, the t thresholds might be altered for different types of materials (e.g., text, graphics, pictures, etc.). Alternately, the thresholds for each pixel could be dynamically changed to take into account the amplitudes of its immediate and not-so-immediate neighbors. This latter type of adaptive thresholding provides computational advantages in terms of both memory usage and speed.

Also, with the present invention, high-pass filtering is not required prior to the display of the image. In addition, image specific look up tables are not required and inexpensive color displays can be used.

Other objects, advantages and novel features of the present invention will become apparent from the following detailed description of the invention when considered in conjunction with the accompanying drawings.

DETAILED DESCRIPTION OF THE DRAWINGS

Figure 1:
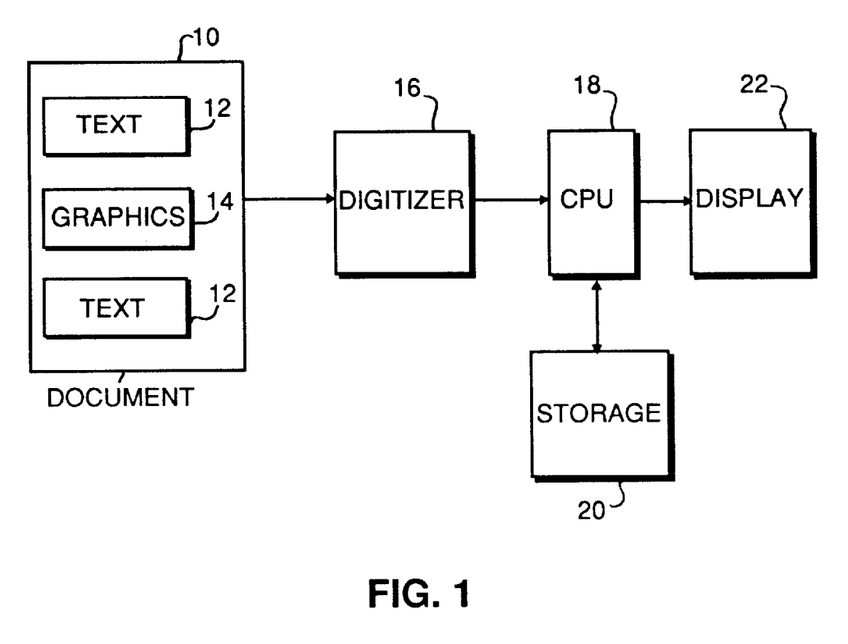
FIG. 1 shows a block diagram of an embodiment of the apparatus of the present invention.

A document 10 that is to be displayed has areas of text 12 and areas of graphics 14, for example. In this context, the term "text" means machine-printed characters, while "graphics" means all other material, including handwritten alpha-numeric characters. Within a single document, the areas of text 12 can have different styles and fonts, for example, bold-face, italic, etc. The graphics 14 can also be of different types.

The document 10 is scanned in by a conventional high resolution digitizer 16. An example of a suitable digitizer 16 that can be used by the present invention is the JX 600 digitizer, manufactured by Sharp.

The digitizer 16 provides a processing means, such as a conventional computer 18 (CPU) with a bit map (hereinafter "map") of the scanned document 10. The CPU 18 can store this map in a suitable storage medium 20, and/or display the document 10 on a display 22. Although the present invention can be used to display documents on a high resolution display, the invention has particular applicability to the use of a low or moderate resolution display 22, such as the Model 1304 display manufactured by Sony.

As an example, the high resolution digitizer 16 scans the document 10 at a spatial resolution of 400 ppi with a digital data resolution of 8 bits per pixel (256 amplitudes). In the apparatus of the invention illustrated in FIG. 1, the display is provided with an image at 100 ppi and 8 bits per pixel.

Figure 2:
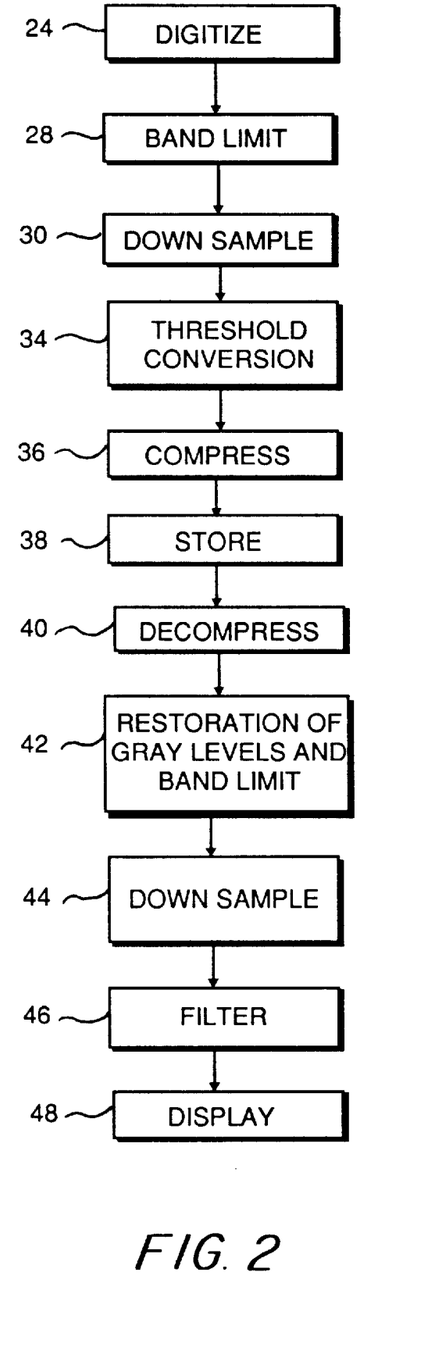
FIG. 2 shows a flow chart illustrating an embodiment of the method of the present invention.

In the embodiment of the method of the present invention illustrated in FIG. 2, the document 10 is scanned and the image is digitized in step 24 by the digitizer 16. In this digitization step 24, the quantized amplitude for each pixel is assigned and a map of the image is provided to the CPU 18, this map having N pixels, with 256 grey levels (N=(400 L)×(400 W), where L is the length in inches and W is the width in inches of the original document).

Band limiting is performed in step 28. This band limiting prevents aliasing and so acts as an anti-aliasing means. Aliasing can occur because of the downsampling (performed in steps 30 and 44) in which the high frequencies are folded back into the low frequency and will produce an artifact. The band limiting performed in step 28 prevents or reduces this aliasing. The band limiting could be performed by a low-pass filter, for example.

In certain applications, the band limiting step 28 will not be necessary because the optics of the scanning device provide the band limiting function.

Figure 8:
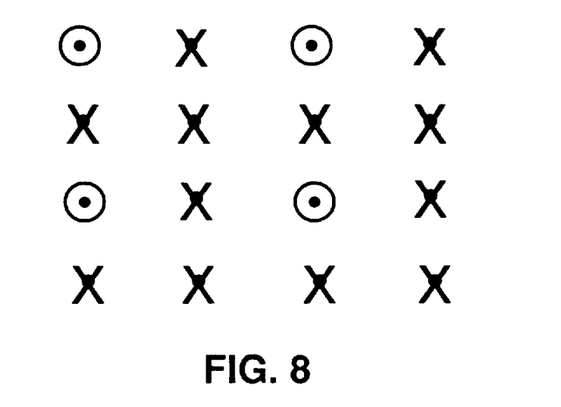
FIG. 8 illustrates the pixels in an area of an image.

From the band limit filtering in step 28, the map of the image is downsampled (by a factor of 2 in a preferred embodiment) in step 30. A graphic example of the downsampling by 2 is illustrated in FIG. 8. In this figure, 16 pixels of the map of the image are illustrated schematically, as dots. To downsample by 2, as is performed in step 30, for example, only the second pixel of every other row is kept. This is indicated by the circles around four of the pixels. Thus, out of sixteen pixels in a given area, only four pixels will remain after the initial downsampling by two.

Although described for exemplary purposes as downsampling by two, the downsampling can also be performed in other ratios so as to provide a desired reduction in pixels.

The downsampled map of the image produced by step 30 is thresholded in step 34. A number (t) of thresholds are used. Although "triple" thresholding (t=3) is described as an exemplary embodiment, other levels of thresholding (i.e. t>3 or t<3) can be performed.

With t=3 (triple thresholding) the number of gray levels is reduced from 8 bits per pixel to 2 bits per pixel. This reduces the cost for data storage, data processing, and data transmission. As explained later with respect to other embodiments of the invention, different thresholds for text and graphics (or for each pixel in the case of adaptive thresholding) can be provided as an input to step 34.

Following the thresholding step 34, the thresholded downsampled map of the image is compressed in step 36 using conventional data compression techniques. After being compressed, the data is stored in a conventional manner for later display. The storage medium can be disk, photo CD, tape, etc.

When a user wishes to display the image, the stored image is decompressed in step 40 using conventional decompression techniques.

After decompression, the thresholded downsampled map is "restored", i.e. the grey levels lost during the thresholding operation are reinstated. Standard convolution/filtering techniques (as well as correlation techniques) can be used to perform this operation. Thus, the data resolution of each downsampled pixel is increased or restored from its 2 bits per pixel grey level information to, for example, 8 bits per pixel grey level information.

After the restoring of the image map to a restored thresholded downsampled map in step 42, either by convolution or correlation, a second downsampling is performed in step 44 if needed for image scaling purposes. This downsampling is similar to the first downsampling performed in step 30 and can be performed in the same ratio as in step 30, or in a different ratio.

After the downsampling step 44, the high resolution image digitized in step 24 is now able to be viewed on a low or moderate resolution display due to the image processing that was performed. The output of the downsampling step 44 (or step 46 if an optional high-pass filter is used) is an image bitmap appropriate for displaying on a CRT or other electronic display with low or moderate resolution and grey scale capability (e.g., 100 ppi, 8 bits/pixel). The image, so displayed on a low or moderate resolution CRT or other appropriate device in step 48, will have an enhanced appearance due to the image processing that has been performed beginning with step 28.

With the above described process, the high resolution digitized image at 400 ppi/8 bits per pixel has been converted to 100 ppi/8 bits per pixel for display on the low or moderate resolution display 22.

Figure 3:
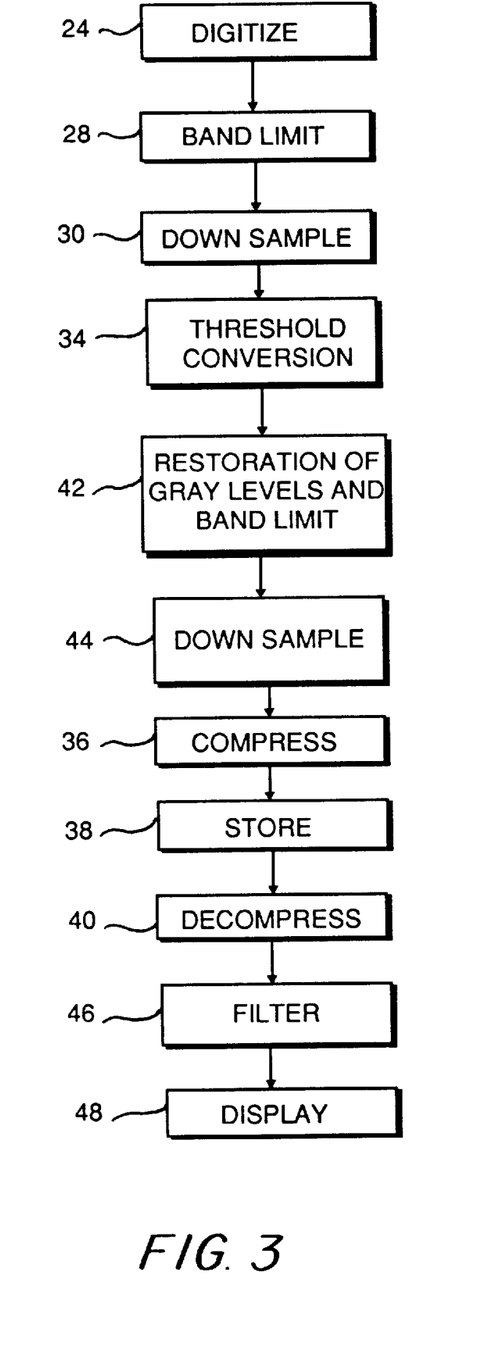
FIG. 3 shows a flow chart of another embodiment of the method of the present invention.

The embodiment of the method illustrated in FIG. 3 is the same as in FIG. 2 except for the location of steps 36, 38 and 40 which relate to the compression, storage and decompression of the data. In the embodiment according to FIG. 3, the compression, store and decompression steps are performed after the second downsampling step 44. In comparison to the embodiment of FIG. 2, the location of these steps after the convolution and downsampling improves the operation of the invention since the image is smoother, and will therefore be easier to compress. Accordingly, more compression techniques will be available for use because of the smoother image.

FIGS. 4–7 show other embodiments of the present invention which further improve the method by providing information to the thresholding step that can be used in determining thresholds.

Figures 4, 5:
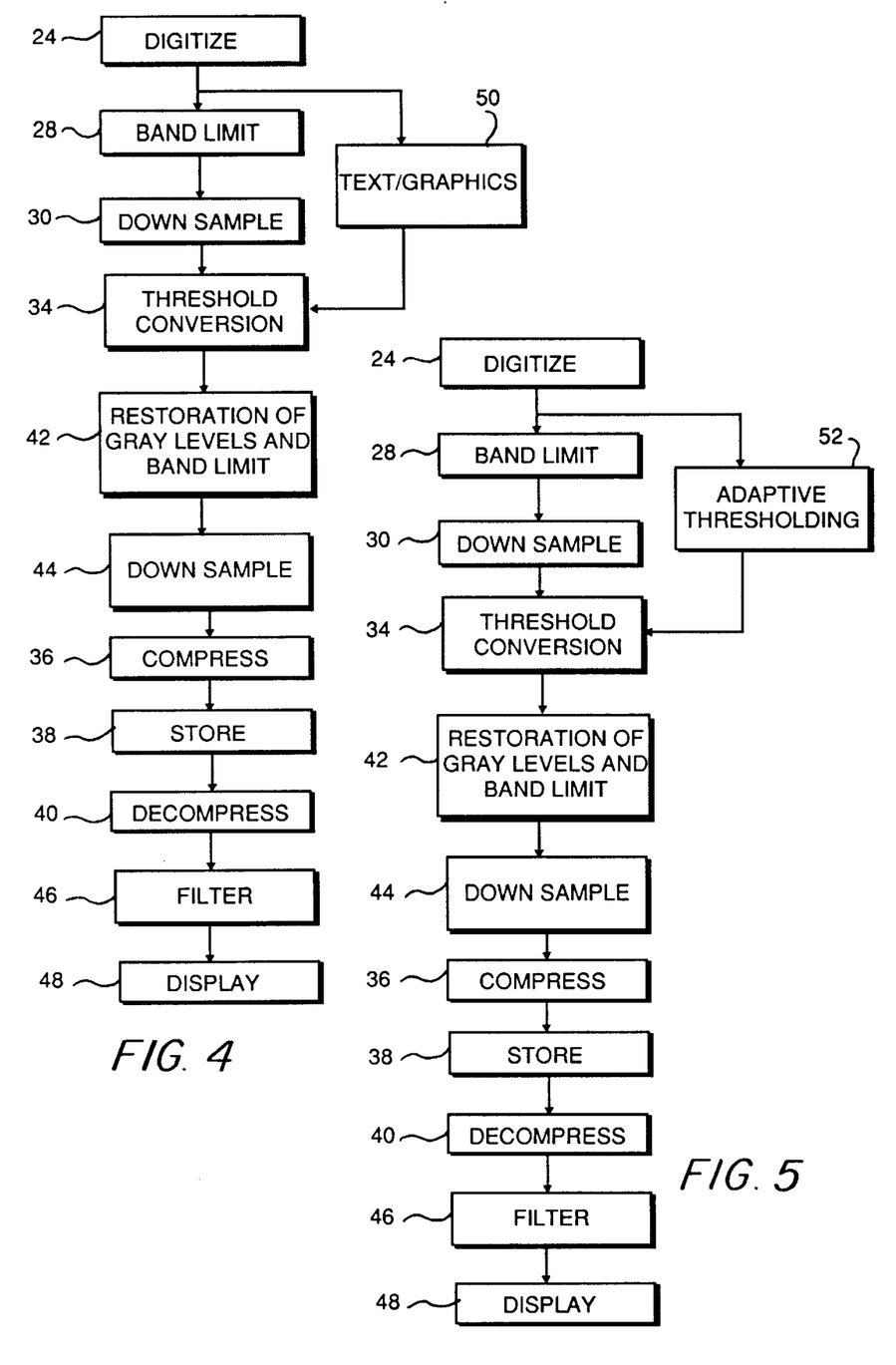
FIG. 4 shows a flow chart of another embodiment of the method of the present invention.
FIG. 5 shows a flow chart of another embodiment of the method of the present invention.

In FIG. 4, similar to FIG. 3, the CPU 18 discriminates between the text areas 12 and the graphic areas 14 in the additional step 50. A method of discriminating between text and graphics areas is described in U.S. Pat. No. 5,050,222 and is herein expressly incorporated by reference.

Once the text and the graphics areas have been discriminated, different thresholds are provided for each of the specific areas of text and graphics. In the preferred embodiment of the present invention, three thresholds (4 ranges) are assigned for text and three different thresholds (with different ranges) are assigned for graphics (FIGS. 9 and 10).

Figure 9:
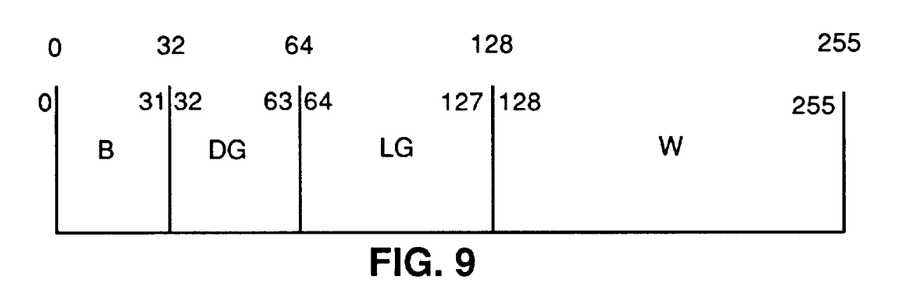
FIG. 9 illustrates an embodiment of the thresholds used for one type of text.
Figure 10:
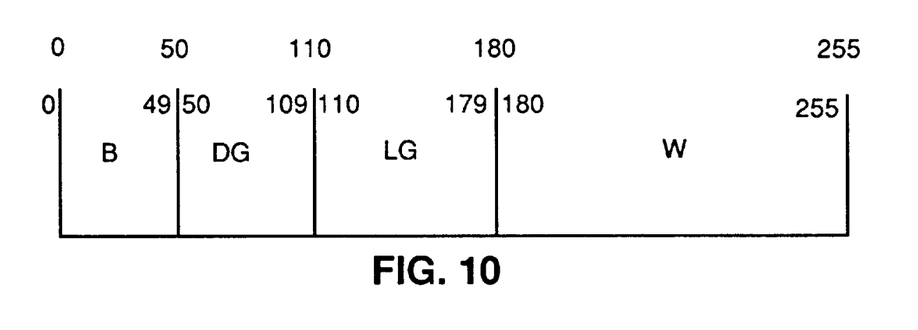
FIG. 10 illustrates an example of the thresholds used for one type of graphics in the method of the present invention.

An example of a threshold set ($t_1$=32, $t_2$=64, $t_3$=128) for one type of text is illustrated in FIG. 9, compared with an example of a threshold set ($t_1$=50, $t_2$=110, $t_3$=180) for a graphics area that is illustrated in FIG. 10. As stated before, the digitizer 16 outputs, for each pixel, 8 bits representing 256 grey levels. In the example of a threshold set of one type of text shown in FIG. 9, the first 32 levels (0–31) represent a black "B" range; levels 32–63 represent a dark grey "DG" range; levels 64–127 represent a light grey "LG" range; and levels 128–255 represent a white "W" range. Similarly, in FIG. 10, which represents an example of a threshold set for one type of graphics, the B range is from 0–49; the DG range from 50–109; the LG range from 110–179; and the W range from 180–255.

With thresholding, the number of levels, or the digital data resolution, is reduced from 256 to 4 so that the number of bits per pixel is reduced from 8 bits per pixel to 2 bits per pixel. The thresholds are different in FIGS. 9 and 10 to accommodate differences between text and graphics. With the thresholds illustrated in FIG. 9 for text, a stroke narrowing would be performed such that lines would be slightly thinner in order to prevent the filling of "e's", "g's", etc. By contrast, the thresholds for the graphics illustrated in FIG. 10 promotes stroke widening, i.e., a slight thickening of lines.

In providing the different thresholds for the different areas of text and graphics, a number of different approaches can be used. For example, a number of fixed ranges can be used, as described above. Another embodiment of the present invention, illustrated in FIG. 5, uses adaptive thresholding, described in copending and commonly assigned U.S. patent applications Ser. Nos. 757,091 and 757,107 filed on Sep. 10, 1991 and herein expressly incorporated by reference. In the adaptive thresholding step 52, the pixels surrounding a specific pixel are considered and the thresholds for the specific pixel are adjusted depending upon the values of the grey levels of the surrounding pixels. These thresholds are provided to the threshold step 34 which reduces the number of bits per pixel.

Figures 6, 7:
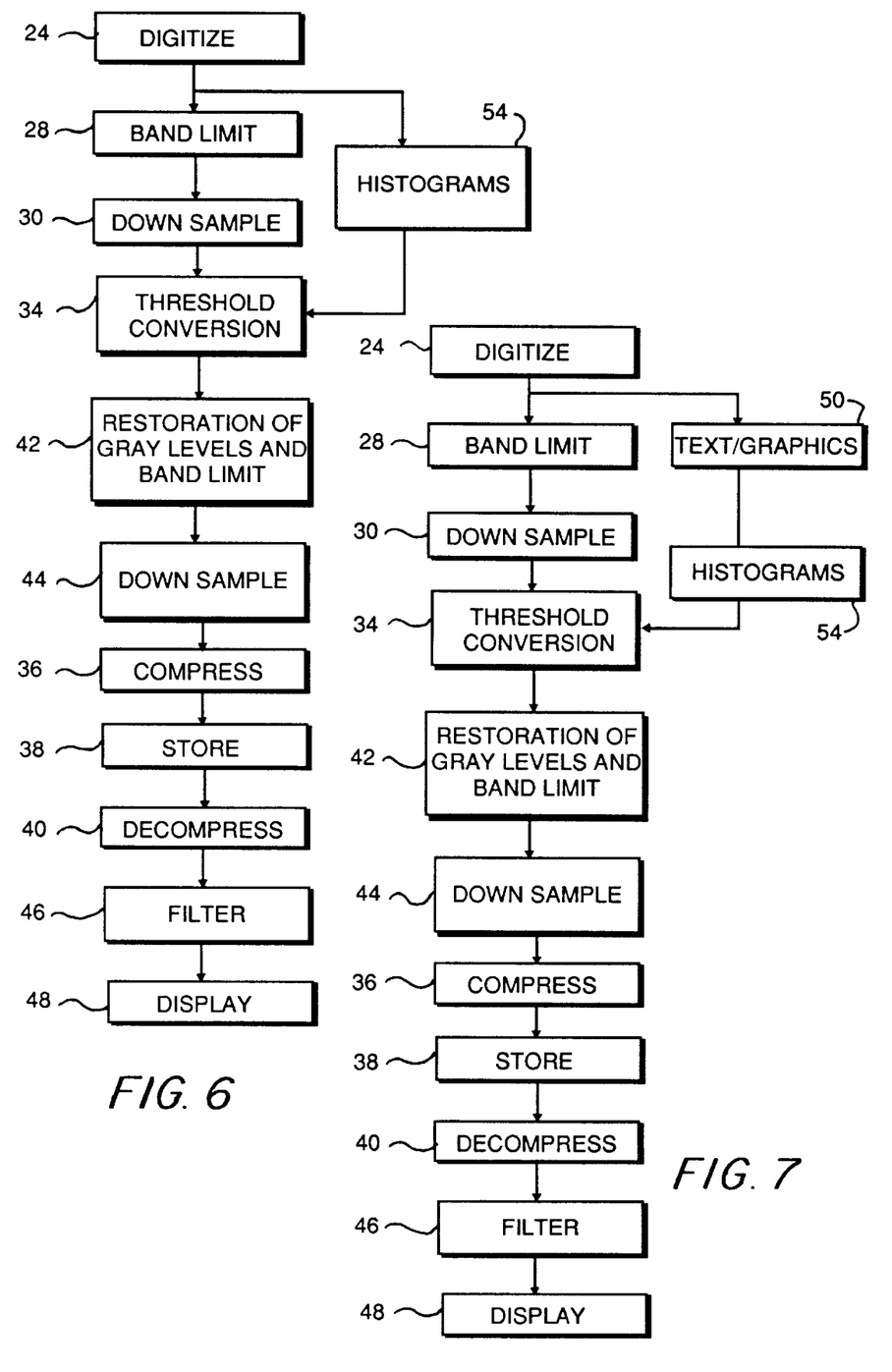
FIG. 6 shows a flow chart of another embodiment of the method of the present invention.
FIG. 7 shows a flow chart of another embodiment of the method of the present invention.

Another method of providing information on which to base the level of the thresholds in step 34 is illustrated in FIG. 6. In this embodiment, step 54 provides histograms to the thresholding step 34. Histograms represent statistical information regarding the frequency of different grey level values in an area under consideration. For example, an area with text will have a large number of pixels with a very dark grey level, and a large number of pixels with a very light grey level, but not very many pixels with intermediate grey levels. With a graphics area, there may be many more pixels with intermediate gray levels. The histograms (step 54) supplied to the threshold step 34 provide the information necessary for selecting the appropriate thresholds based on the frequency of the different grey levels appearing in the area.

The production of the histogram information is conventional, such as that described in Digital Image Processing, by Rafael Gonzalez and Paul Wintz (Addison-Wesley, Reading, Mass., 1987). Once this information is provided, the threshold step 34 provides different thresholds which vary with histogram content.

The embodiment of FIG. 7 combines the advantages of the text/graphics discrimination step 50 of FIG. 4 with the histogram step 54 of FIG. 6. The information from the text/graphics discriminator is further refined by the histograms of these defined areas, so that the thresholds can be even more precisely tailored to the individual areas of a document that has been scanned.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of processing an image, comprising the steps of:
    a) digitizing the image to produce a map of the image, said map containing pixels having a digital data resolution of $2^n$ grey levels, where n is the number of bits per pixel;
    b) downsampling the map of the image digitized in step a) to produce a downsampled map of the digitized image; and
    c) reducing the digital data resolution of the digitized image by thresholding the downsampled map of the digitized image to reduce the number of bits per pixel from n bits per pixel to m bits per pixel, to thereby produce a reduced digital data resolution, thresholded downsampled map of the digitized image, where m is greater than one and is less than n.

2. A method according to claim 1, further including the steps of:
    d) coupling the reduced data resolution digitized image obtained in step c) to a digital data communication medium;
    e) increasing the data resolution of the digitized image by increasing the number of bits per pixel from m bits to p bits, where p is greater than m, to an increased data resolution, thresholded downsampled map of the digitized image; and
    f) displaying the restored thresholded downsampled map to create a final image.

3. The method of claim 1, wherein step c) includes discriminating between pixels of text and pixels of graphics within the map of the digitized image and assigning different thresholds to said pixels of text and to said pixels of graphics.

4. The method of claim 1, wherein step c) includes adaptively assigning different thresholds, such that the assigning of a threshold to a particular pixel is dependent on surrounding pixels in the area of the particular pixel.

5. The method of claim 1, wherein step b) includes filtering the downsampled map of the image.

6. The method of claim 2, wherein step e) includes convolving the thresholded downsampled map of the image.

7. The method of claim 2, wherein step e) includes correlating the thresholded downsampled map of the image.

8. The method of claim 3, wherein step c) comprises the step of providing different thresholds for different types of text, and different thresholds for different types of graphics.

9. The method of claim 1, wherein step b) comprises the step of anti-aliasing the map of the image.

10. The method of claim 9, wherein the step of anti-aliasing includes band limiting.

11. The method of claim 10, wherein the step of band limiting includes low-pass filtering.

12. The method of claim 2, wherein step e) comprises the step of high-pass filtering the increased data resolution, thresholded downsampled map of the digitized image prior to the displaying of the digitized image.

13. The method of claim 2, wherein p is equal to n.

14. The method of claim 2 wherein step d) comprises the steps of:
   d1 compressing the thresholded downsampled map of the digitized image;
   d2 storing the compressed thresholded downsampled map of the digitized image; and
   d3 decompressing the compressed thresholded downsampled map of the digitized image.

15. The method of claim 2, further comprising, after step e), the step of downsampling the increased data resolution thresholded downsampled map of the digitized image.

16. The method of claim 1, wherein the step b) of downsampling is performed in a 2:1 ratio.

17. The method of claim 1, wherein the step c) of thresholding includes applying three thresholds to the downsampled map of the image.

18. The method of claim 1, wherein step c) comprises producing histogram information and assigning thresholds to image areas in dependence on the histogram information.

19. The method of claim 1, wherein step c) comprises discriminating between pixels of text and pixels of graphics within the map of the image and producing histogram information and assigning different thresholds to said pixels of text and to said pixels of graphics in dependence on the histogram information.

20. An apparatus for processing an image, comprising:
   a) a high resolution scanner that digitizes the image to produce a map of the image, said map containing pixels having a digital data resolution of $2^n$ grey levels where n is the number of bits per pixel;
   b) means for downsampling the map of the digitized image to produce a downsampled map of the digitized image; and
   c) means for reducing the data resolution of the digitized image by thresholding the downsampled map of the digitized image to reduce the number of bits per pixel from n bits to m bits per pixel, to thereby produce a reduced data resolution thresholded downsampled map of the digitized image, where m is greater than one and is less than n.

21. The apparatus of claim 20, wherein said data resolution reducing means comprises means for discriminating between pixels of text and pixels of graphics within the map of the image and assigning different thresholds to said pixels of text and to said pixels of graphics.

22. The apparatus of claim 20, further including:
   d) a digital data communication medium to which the reduced data resolution thresholded downsampled map of the digitized image is coupled;
   e) means, coupled to said digital data communication medium, for increasing the number of bits per pixel from m bits to p bits, where p is greater than m, to produce an increased data resolution thresholded downsampled map of the image; and
   f) a low or moderate resolution display that displays the image represented by the increased data resolution thresholded downsampled map of the image.

23. The apparatus of claim 20, further comprising means for filtering the downsampled map of the image.

24. The apparatus of claim 22, further comprising means for convolving the thresholded downsampled map of the image.

25. The apparatus of claim 22, further comprising means for correlating the thresholded downsampled map of the image.

26. The apparatus of claim 20, wherein said data resolution reducing means comprises means for providing different thresholds for different types of text, and different thresholds for different types of graphics.

27. The apparatus of claim 20, further comprising means for anti-aliasing the map of the image.

28. The apparatus of claim 27, wherein the means for anti-aliasing includes means for band limiting.

29. The apparatus of claim 28, wherein the means for band limiting includes a low-pass filter.

30. The apparatus of claim 22, further comprising means for high-pass filtering the increased data resolution thresholded downsampled map of the image prior to the displaying of the image.

31. The apparatus of claim 22, wherein p is equal to n.

32. The apparatus of claim 22, further comprising means for compressing the thresholded downsampled map of the image and applying the compressed thresholded downsampled map to said digital data communication medium, means for storing the compressed thresholded downsampled map of the image, and means for decompressing the compressed thresholded downsampled map of the image.

33. The apparatus of claim 20, wherein said means for downsampling performs downsampling in a 2:1 ratio.

34. The apparatus of claim 20, wherein the means for thresholding applies three thresholds to the downsampled map of the image.

35. The apparatus of claim 22, further comprising means for further downsampling the increased data resolution thresholded downsampled map of the image prior to display by the low or moderate resolution display.

36. The apparatus of claim 20, wherein said data resolution reducing means comprises means for producing histogram information and assigning thresholds to image areas in dependence on the histogram information.

37. The apparatus of claim 20, wherein said data resolution reducing means comprises means for discriminating between pixels of text and pixels of graphics within the map of the image and producing histogram information and assigning different thresholds to said pixels of text and to said pixels of graphics in dependence on the histogram information.

38. A method of reducing the overall data resolution of a digital image, said digital image comprising an N×M array of pixels, each of said pixels having a first data resolution in the form of a first multi-bit digital code, comprising the steps of:
   (a) subsampling said digital image to derive a reduced spatial resolution digital image comprised of a J×K array of pixels which is smaller than that of said N×M array; and
   (b) reducing the data resolution of said reduced spatial resolution digital image derived from step (a) by quantizing, in accordance with plural quantizing thresholds, the first multi-bit digital codes of the pixels of said J×K array into second multi-bit digital codes having a code width less than that of said first multi-bit digital codes.

39. A method according to claim 38, wherein step (b) comprises quantizing first multi-bit digital codes of the pixels of a first selected portion of said J×K array into second multi-bit digital codes in accordance with a first plurality of quantizing thresholds, and quantizing first multi-bit digital codes of the pixels of a second selected portion of said J×K array into second multi-bit digital codes in accordance with a second plurality of quantizing thresholds different from said first plurality of quantizing thresholds.

40. A method according to claim 38, wherein step (b) comprises quantizing first multi-bit digital codes of the pixels of a first portion of said J×K array having a first type of image content into second multi-bit digital codes in accordance with a first plurality of quantizing thresholds associated with said first type of image content, and quantizing first multi-bit digital codes of the pixels of a second portion of said J×K array having a second type of image content, different from said first type of image content, into second multi-bit digital codes in accordance with a second plurality of quantizing thresholds associated with said second type of image content.

41. A method according to claim 40, wherein said first type of image content corresponds to text and said second type of image content corresponds to graphics.

42. A method according to claim 38, wherein step (b) includes establishing said plural quantizing thresholds in accordance with a histogram of characteristics of said digital image.

43. A method according to claim 38, wherein step (b) comprises adaptively adjusting said plural quantizing thresholds, by way of which the first multi-bit code of a respective pixel is quantized into a second multi-bit code, in accordance with contents of a local portion of said digital image surrounding said respective pixel.

44. A method according to claim 38, further comprising the steps of:

(c) compressing the reduced data resolution digital image obtained by step (b); and (d) storing the compressed, reduced data resolution digital image obtained by step (c).

45. A method of processing a digital image, said digital image comprising an N×M array of pixels, each of said pixels having a first data resolution in the form of a first multi-bit digital code, comprising the steps of:

(a) subsampling said digital image to derive a reduced spatial resolution digital image comprised of a J×K array of pixels which is smaller than that of said N×M array;

(b) reducing the data resolution of said reduced spatial resolution digital image derived from step (a) by quantizing, in accordance with plural quantizing thresholds, the first multi-bit digital codes of the pixels of said J×K array into second multi-bit digital codes having a code width less than that of said first multi-bit digital codes;

(c) coupling the reduced data resolution digital image obtained by step (b) to a data communication path;

(d) increasing the data resolution of said reduced data resolution digital image by converting said second multi-bit digital codes of the pixels of said J×K array into third multi-bit digital codes having a code width greater than that of said second multi-bit digital codes; and (e) controlling the operation of a digital reproduction device in accordance with said third multi-bit digital codes, so as to provide a reproduction of said digital image.

46. A method according to claim 45, wherein the code width of said third multi-bit codes is less than the code width of said first multi-bit codes.

47. A method according to claim 45, wherein step (b) comprises quantizing first multi-bit digital codes of the pixels of a first selected portion of said J×K array into second multi-bit digital codes in accordance with a first plurality of quantizing thresholds, and quantizing first multi-bit digital codes of the pixels of a second selected portion of said J×K array into second multi-bit digital codes in accordance with a second plurality of quantizing thresholds different from said first plurality of quantizing thresholds.

48. A method according to claim 45, wherein step (b) comprises quantizing first multi-bit digital codes of the pixels of a first portion of said J×K array having a first type of image content into second multi-bit digital codes in accordance with a first plurality of quantizing thresholds associated with said first type of image content, and quantizing first multi-bit digital codes of the pixels of a second portion of said J×K array having a second type of image content, different from said first type of image content, into second multi-bit digital codes in accordance with a second plurality of quantizing thresholds associated with said second type of image content.

49. A method according to claim 48, wherein said first type of image content corresponds to text and said second type of image content corresponds to graphics.

50. A method according to claim 45, wherein step (b) includes establishing said plural quantizing thresholds in accordance with a histogram of characteristics of said digital image.

51. A method according to claim 45, wherein step (b) comprises adaptively adjusting said plural quantizing thresholds, by way of which the first multi-bit code of a respective pixel is quantized into a second multi-bit code, in accordance with contents of a local portion of said digital image surrounding said respective pixel.

52. The method of claim 15, wherein step d) comprises the steps of:

d1 compressing the increased data resolution thresholded downsampled of the digitized image;

d2 storing the compressed increased data resolution thresholded downsampled map of the digitized image; and d3 decompressing the compressed increased data resolution thresholded downsampled map of the digitized image.

53. The apparatus of claim 20, wherein said data resolution reducing means comprises means for assigning different thresholds adaptively, such that the assigning of a threshold to a particular pixel is dependent on surrounding pixels in the area of the particular pixel.

* * * * *